United States Patent
Eschbach

(10) Patent No.: US 7,646,508 B2
(45) Date of Patent: Jan. 12, 2010

(54) METHOD AND APPARATUS FOR PROCESSING DIGITAL IMAGES

(75) Inventor: Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 631 days.

(21) Appl. No.: 11/554,049

(22) Filed: Oct. 30, 2006

(65) Prior Publication Data

US 2008/0100853 A1    May 1, 2008

(51) Int. Cl.
*G06F 15/00* (2006.01)
*G06K 1/00* (2006.01)
*H04N 1/60* (2006.01)
*G06K 15/00* (2006.01)
*H04N 1/405* (2006.01)

(52) U.S. Cl. .......................... 358/1.9; 358/3.1

(58) Field of Classification Search ............ 358/1.1, 358/1.15, 1.13, 1.14, 1.9, 1.2, 3.1, 3.11, 3.12, 358/3.23
See application file for complete search history.

(56) References Cited

U.S. PATENT DOCUMENTS

| 5,414,538 | A | 5/1995 | Eschbach |
| 5,581,370 | A | 12/1996 | Fuss et al. |
| 6,023,527 | A | 2/2000 | Narahara |
| 6,192,149 | B1 | 2/2001 | Eschbach et al. |
| 6,611,290 | B1 | 8/2003 | Sato |
| 7,586,521 | B2 * | 9/2009 | Wong ..................... 348/222.1 |
| 2001/0020978 | A1 | 9/2001 | Matsui et al. |

FOREIGN PATENT DOCUMENTS

EP    1197917    4/2009

OTHER PUBLICATIONS

European search report for corresponding European application 07119280.1.
Xerox Color Encoding Standard; XNSS 289005/288811; Mar. 1989; Xerox Corporation, Xerox System Institute, 475 Oakmead Parkway, Sunnyvale, CA 94086 US.
Heckbert, P.;Color Image Quantization for Frame Buffer Display; in SIGGRAPH Proceedings; ACM vol. 16 No. 3; Jul. 1982, pp. 297-307.

* cited by examiner

*Primary Examiner*—Douglas Q Tran
(74) *Attorney, Agent, or Firm*—Duane C. Basch; Basch & Nickerson LLP

(57) ABSTRACT

A method and apparatus to process digital images is described. The method is particularly effective in improving the appearance of digital images that originate in digital cameras and have been pre-processed in the camera.

20 Claims, 5 Drawing Sheets

METHOD AND APPARATUS FOR PROCESSING DIGITAL IMAGES

Disclosed are methods and apparatus to process digital images, and more particularly methods and apparatus effective in improving the appearance of digital images that originate in digital cameras and have been pre-processed in the camera.

BACKGROUND AND SUMMARY

Digital images are in very common use these days, driven in large part by the wide availability of digital cameras. When printing digital images it is common to rely on some sort of automatic processing to improve the visual appearance of the printed image. Such automatic correction systems can be fooled if the image has already been processed by the digital camera. Described herein are a method and apparatus that can automatically improve images that have been processed by a digital camera.

A common problem in image reproduction is the mismatch of the color space definition inside the digital file with the actual color space of the scene data. This can be caused by post-processing or a variety of other reasons. The most obvious mismatch is the mismatch in the gamma of the color space coordinates, where some devices intentionally use different gammas, e.g. gamma=1 for print and gamma=1.8 for display, and some devices use an effective different gamma based on scene content and lighting settings.

Disclosed in embodiments herein is a method for processing digital images comprising: (a) receiving a digital image to be printed; (b) selecting one of a predetermined set of target image gamma values; (c) transforming the digital image, using the selected set of target image gamma values, to produce a transformed image, wherein the gamma of the transformed image is that of the selected gamma value; (d) applying a first image evaluation test to the transformed image, including measuring at least a first image parameter of the transformed digital image, and comparing the measured first image parameter to that for an ideal image; (e) applying a second image evaluation test to the transformed image, including measuring at least a second image parameter of the transformed digital image, comparing the second image parameter to that for an ideal image, wherein the first and second image parameters are different; (f) calculating image quality using a pre-defined image quality function employing the values of the first image parameter and the second image parameter; (g) repeating steps (c) through (f) for each of the set of predetermined target gamma values; (h) selecting the target gamma value that has highest value of the image quality function; and (i) printing the image using the selected target gamma value.

Further disclosed in embodiments herein is a system for processing an image comprising: (a) a source of digital images; (b) an image memory connected to said source of digital images; (c) a gamma transformation module connected to the image memory, said gamma transformation module transforms the gamma of the stored digital image to a new gamma value chosen from a set of predefined test gamma values; (d) a first image evaluation module, connected to the gamma transformation module, wherein the first image evaluation module measures a first parameter of the gamma-transformed image and compares it to values characteristic of an ideal image; (e) a second image evaluation module, connected to the gamma transformation module, wherein the second image evaluation module measures a second parameter of the gamma-transformed image and compares it to values characteristic of an ideal image, and where the parameters measured are different from those measured by the first image evaluation module; (f) a image quality function computation module receiving the parameter values from the first image evaluation module and the second image evaluation module which computes an image quality value based on at least the first and second parameters and a predefined function of the parameters; (g) a control module connected to the image memory, the gamma transformation module, the first and second image evaluation modules, and the image quality function module, wherein the control module sets the test gamma value to be used, and keeps a record of the value of the image quality function for each test gamma value, said control module, upon determining that all of the predefined set of test gamma values have been evaluated, sends the gamma value with the best image quality value to a printer for printing the image using that gamma value.

BRIEF DESCRIPTION OF THE DRAWING

The drawings are only for purposes of illustrating various embodiments and are not to be construed as limiting, wherein.

Figure 1:
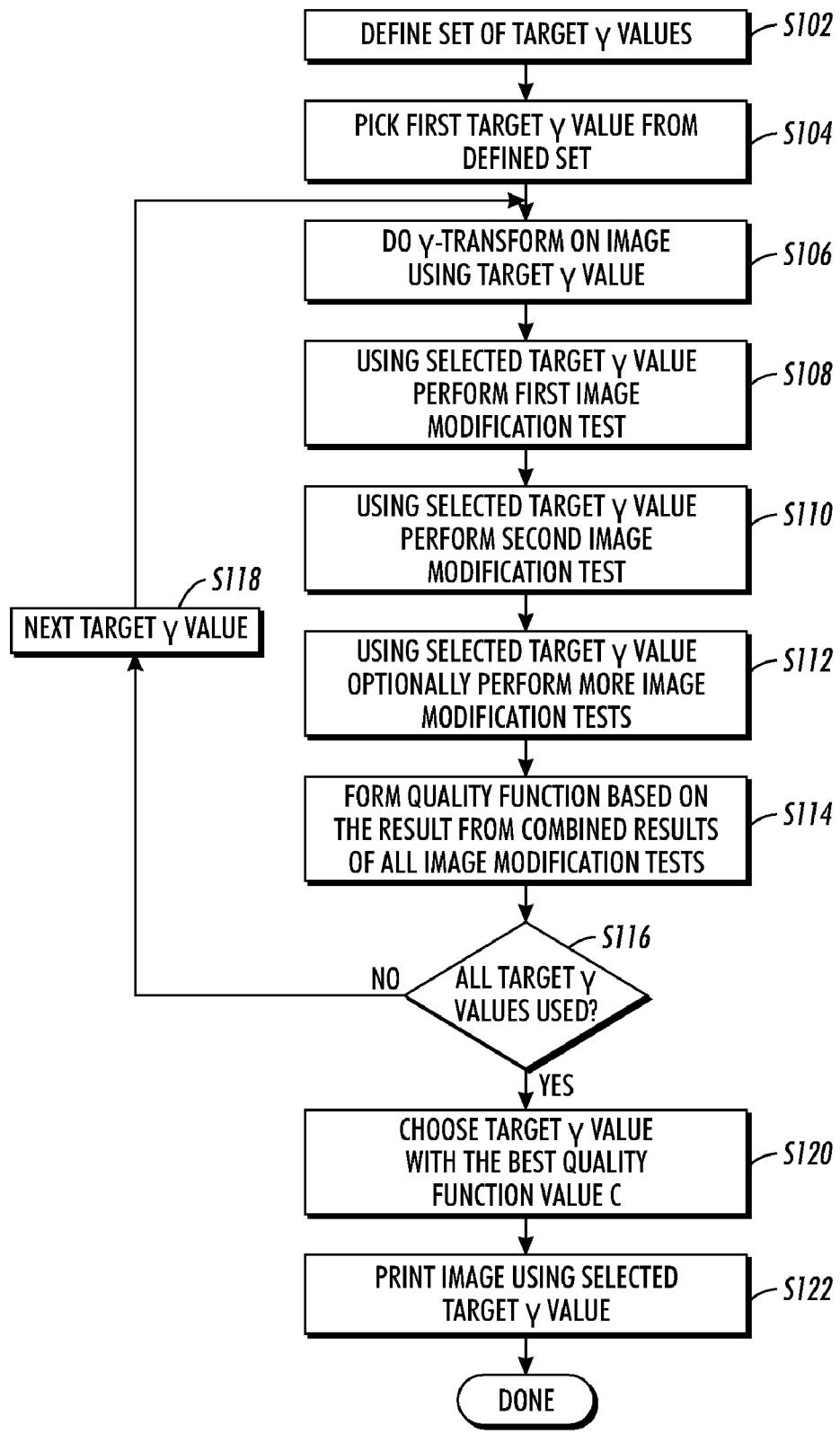
FIG. 1 illustrates the schematic flow of a method for processing digital images.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

The strategy employed by the method described herein is based on identifying ways to improve images. Since known methods may not work well if the images have been pre-processed, for example by a digital camera, the current embodiments use a combination of methods to better identify the proper value of gamma for the image. To do this, the image is transformed using several different test values of gamma, and for each of these values apply several improvement methods. For each method, one or more parameters are calculated that indicate the degree of improvement of the image using that method. For each test value of gamma, the parameters from the several methods are combined to generate a quality measure of that gamma value. After trying all of the set of test gamma values, the gamma value with the best quality factor is chosen as the appropriate gamma for reproducing the image.

FIG. 1 is a flow chart showing a method of processing a digital image. The method tries to automatically find the optimum value of gamma that will maximize the appearance of any printed version of the image. The method is particularly effective for images that have previously been processed in some way, for example by a digital camera, prior to being submitted to the process being described.

Referring to FIG. 1, in step S102 a set of trial gamma values is defined. This set of values covers the range of values that are to be expected in normal printing situations. It is not necessary that the set is very large; suitably spaced values across a range of about 1.0 to 3.0 will be sufficient. For example, a set of trial values that includes gamma={1.0, 1.4, 1.8} is sufficient for most needs. If need be, values of gamma including 2.0 and 2.2 may be added if the range of images to be processed and the associated printer can support these higher values. The definition of the set of trial gamma values need take place only once; at the beginning of the implementation of the method being described.

In step S104 the process starts by setting a test gamma value equal to one of the set of trial gamma values defined in step S102. Using the selected trial gamma value, in step S106, transform the image to the new gamma. The transformation is described by the equation:

$$I_{out} = I_{in}^{\gamma},\qquad\text{Eq. 1}$$

where $I_{in}$ is the input pixel value and $I_{out}$ is the resulting pixel value after the transformation, and g is the value of gamma chosen for testing.

All subsequent processing takes place using this transformed image.

In step S108 the process continues by assessing the effect of modifying the image using the test gamma value. The effects of modifying the image can be assessed in a number of ways; in general the process intent is to evaluate one or more image parameters to see how they compare to a well processed image. Some of these parameters can include, for example, the range of pixel values, the overall contrast of the image, a direct measure of the image gamma using the effective luminance and effective saturation of the image, or other tests.

In step S110 the process continues by performing a second image assessment test. This second test can come from the same set as step S108, but should be different from the first chosen assessment test. More specifically, the parameters tested are intentionally different in each of the tests.

In optional step S112 the process may continue to assess further image parameters of the gamma-transformed image. In practice it is believed that approximately four different assessment tests are sufficient to identify image parameters that will confidently indicate the correct gamma value.

In step S114 the relevant parameters determined from the tests are combined to develop a quality measure of the transformed image. Such a quality measure is intended to measure how closely the gamma-transformed image comes to the parameters of an ideal image. The image quality measure is computed using a predefined function of the image evaluation parameters from steps S108-S112. The value of the image quality function is saved in memory together with the trial gamma value used.

Step S116 checks to see if steps S106-S114 were performed for all of the set of trial gamma values. If not, processing continues at step S118 where the next trial gamma value is selected from the target set and the assessment and quality function generation process is repeated.

When the assessment process has been performed using each of the elements of the target gamma value set, step S116 proceeds to step S120. In this step the set of quality factors that were generated is examined, and from these the gamma value that had quality factor with the highest or best value is selected. This gamma value is then used in subsequent processing or rendering of the image, for example, in step S122 to print the image, using the selected gamma value.

Figure 2:
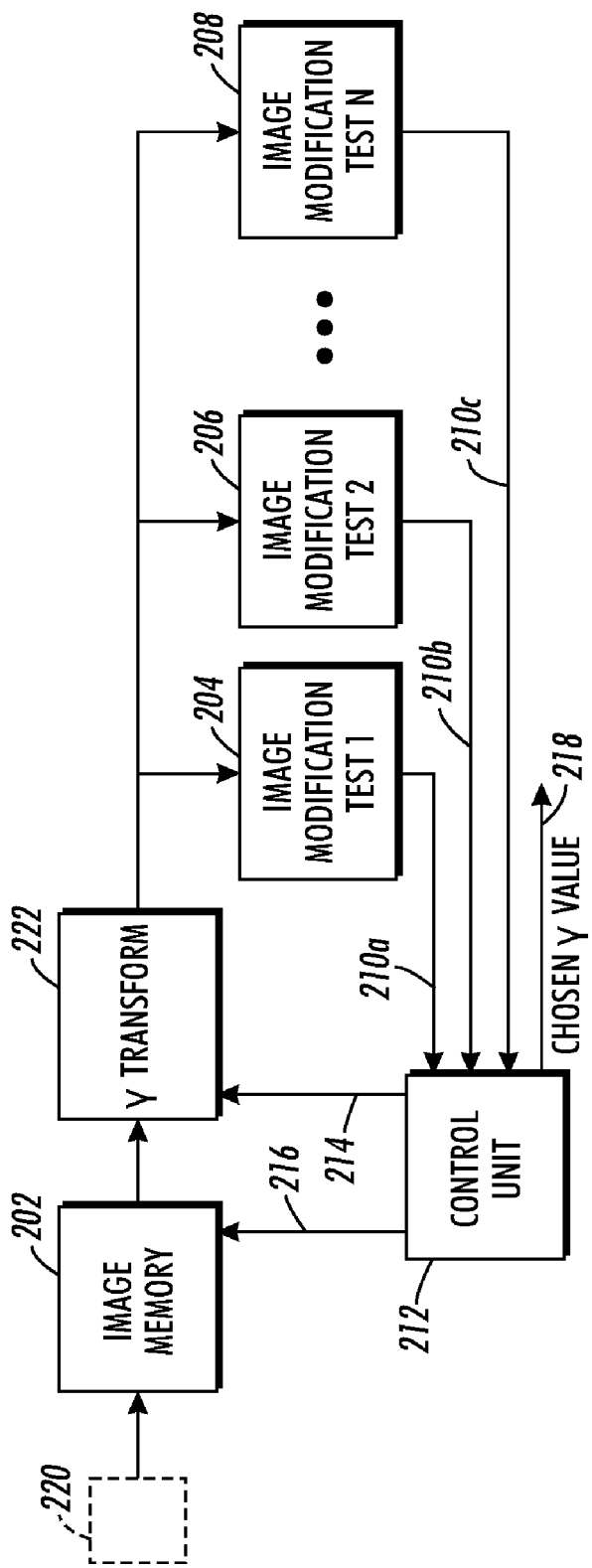
FIG. 2 illustrates an apparatus for processing digital images based on the method shown in FIG. 1.

Referring to FIG. 2 there is depicted a block diagram of an apparatus suitable for carrying out aspects of the process described above, and in particular an apparatus that can identify a proper value of gamma to be used to print an image. An input image 220 is stored in an image memory 202 for use during the evaluation phase. A set of target gamma values are stored in the Control Unit 212. Control unit 212 might be a software element running on the controlling microprocessor that operates the printer, or it could be implemented as a highly integrated application specific integrated circuit (ASIC).

The control unit sends a target gamma value to the gamma transformation unit 222. This unit transforms the image so that the image at its output has a gamma value equal to the target gamma value. The gamma-transformed image is then fed to a number of image evaluation units, here shown as 204, 206, and 208. Each of the image evaluation units computes one or more parameters of the image, stores the parameters and compares them to the characteristic values of an ideal image. These characteristic values might include, for example, the tonal range of the image pixel values, or the overall image contrast.

The output of each image evaluation unit is fed to the control unit 212 via signal paths 210a, 210b, and 210c. The control unit computes a quality function for the target gamma. The quality function is set as a function of the parameters that characterize each image evaluation test and can be implemented, for example, as a software element on the controller 212.

The control unit then commands the evaluation process again, with another target gamma value, storing the quality function for each gamma value, until all the desired potential gamma values have been evaluated. The control unit then chooses as an optimum gamma value that gamma value that had the largest value of the image quality function, and transmits this optimum gamma value via control signal 218, to the printer. Alternatively, the control unit can transform the image using the optimum gamma value and send the transformed image to the printer.

In describing the details of the image evaluation tests that follows, the tests are more effective if the image is composed in a three component luminance-chrominance space. This space might be, for example, the Xerox YES space as described in "Xerox Color Encoding Standard", XNSS 289005, 1989, which is hereby incorporated by reference in its entirety. Other three-color spaces can also be used, for example L*a*b*. If the input image is not in such a space then it is assumed that before executing any of the image evaluation tests to be described, the image is transformed into the three-component space. For the remainder of the examples this space is assumed to be characterized as Xerox YES.

When deciding how many of the subtests to perform a balance must be struck between the increase in improvement afforded by adding more tests versus the extra computational expense of performing the extra tests. It has been found that a good balance is struck with about four subtests, where these tests are based on previous methods of image evaluation and improvement.

The first subtest evaluates the image to derive parameters related to the overall exposure quality of the image. The evaluation method we describe here was first described in U.S. Pat. No. 5,414,538, hereby incorporated by reference in its entirety. The evaluation begins by generating a histogram of the image, H(I) and then evaluating the range of exposure values in the histogram to see if they correspond to the range that is expected of a well-exposed image. The histogram of the image is generated, and then the darkest and lightest levels in the image are compared to preselected thresholds. To ensure that the process is not misled by anomalies at either extreme of the histogram, the process is repeated for the range that covers the central 90% of the image as well as for the entire range of the histogram. There may be separate threshold levels for the 100% and 90% tests, or they may be the same.

For each range, four possible cases may arise:

| Response | $I_{light} > T_{light}$ | $I_{dark} > T_{dark}$ | Action | gamma |
|---|---|---|---|---|
| 00 | Yes | Yes | None | 1 |
| 01 | Yes | No | Increase Darkness | >1 |
| 10 | No | Yes | Increase Brightness | <1 |
| 11 | No | No | None | 1 |

Where $I_{light}$ is the lightest level in the histogram, and $T_{light}$ is the threshold for the lightest value. Similarly, $I_{dark}$ is the darkest level in the histogram, and $T_{dark}$ is the corresponding dark threshold.

Figure 3:
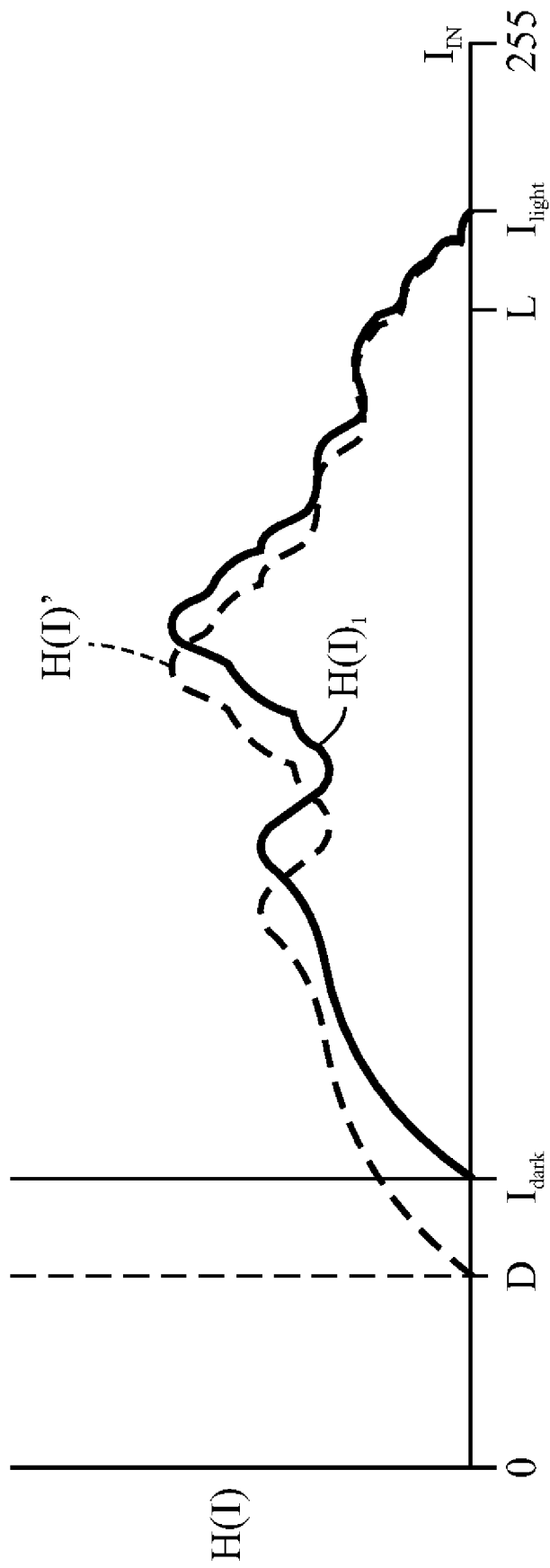
FIG. 3 illustrates a histogram of an image showing the image limits and threshold values.

FIG. 3, taken from U.S. Pat. No. 5,414,538, shows a typical histogram. The values of $I_{dark}$ and $I_{light}$ are shown, as well as values of the thresholds $T_{dark}$ and $T_{light}$. For the histogram shown, the image uses less than the desired range of intensities, since $I_{dark}$ is larger than $T_{dark}$. Thus this image could be improved by changing gamma to move $I_{dark}$ to $T_{dark}$. Similarly, images where $I_{light}$ is below $T_{light}$ can be improved by applying a gamma transformation to moving the lightest pixels to $T_{light}$.

Response 00 is characteristic of a good image, that is one that utilizes the full range of exposure. Response 11 indicates an image that has problems that are not intended for correction by the methods disclosed. Responses 01 or 10 are indicative of images that are either too light (response 10) or too dark (response 01). For these two cases, a value of gamma is derived that would transform the darkest (or lightest) value in the histogram to the corresponding threshold. If, for example, we let $T_{dark}$ be the dark threshold, and $I_{dark}$ be the dark value from the histogram, the gamma value would be given by the equation:

$$\gamma = \ln(T_{dark}/255)/\ln(I_{dark}/255) \qquad \text{Eq. 2}$$

This evaluation is applied for both the full histogram to give a value of γ100, and also for the 90% center of the histogram to give a value γ90.

The second sub-test is derived from a test designed to detect images that may be improved by adjusting the overall contrast of the image. One evaluation method that may be used was first described in detail in U.S. Pat. No. 5,581,370, hereby incorporated by reference in its entirety. In this evaluation, the subsampled and YES-transformed image is evaluated in two similar and parallel processes. First, the histogram of the entire image is calculated and the variance of the histogram is calculated. This variance, given by:

$$V = c^* \Sigma (H(I) - H\text{bar})^2 \qquad \text{Eq. 3}$$

where:
C is a suitable normalization constant,
H(I) is the value of the histogram at point I,
Hbar is the average of the entire histogram.

This variance is a measure of the contrast of the image; low values correspond to a low contrast image, while larger values correspond to a higher contrast image.

The evaluation process is then extended in an analogous fashion by dividing the image into N separate areas and evaluating the histogram and its variance for each area separately. The variance of each local histogram is compared to the global variance and a count is kept of the number of local histograms that are smaller than some constant value times the global histogram. The constant value has been found to be approximately 2; that is all local histograms are marked whose variances are less than twice the global histogram variance. The output of this evaluation procedure is thus the global variance value, and the number of local histograms that fall within the comparison criterion.

Figure 4:
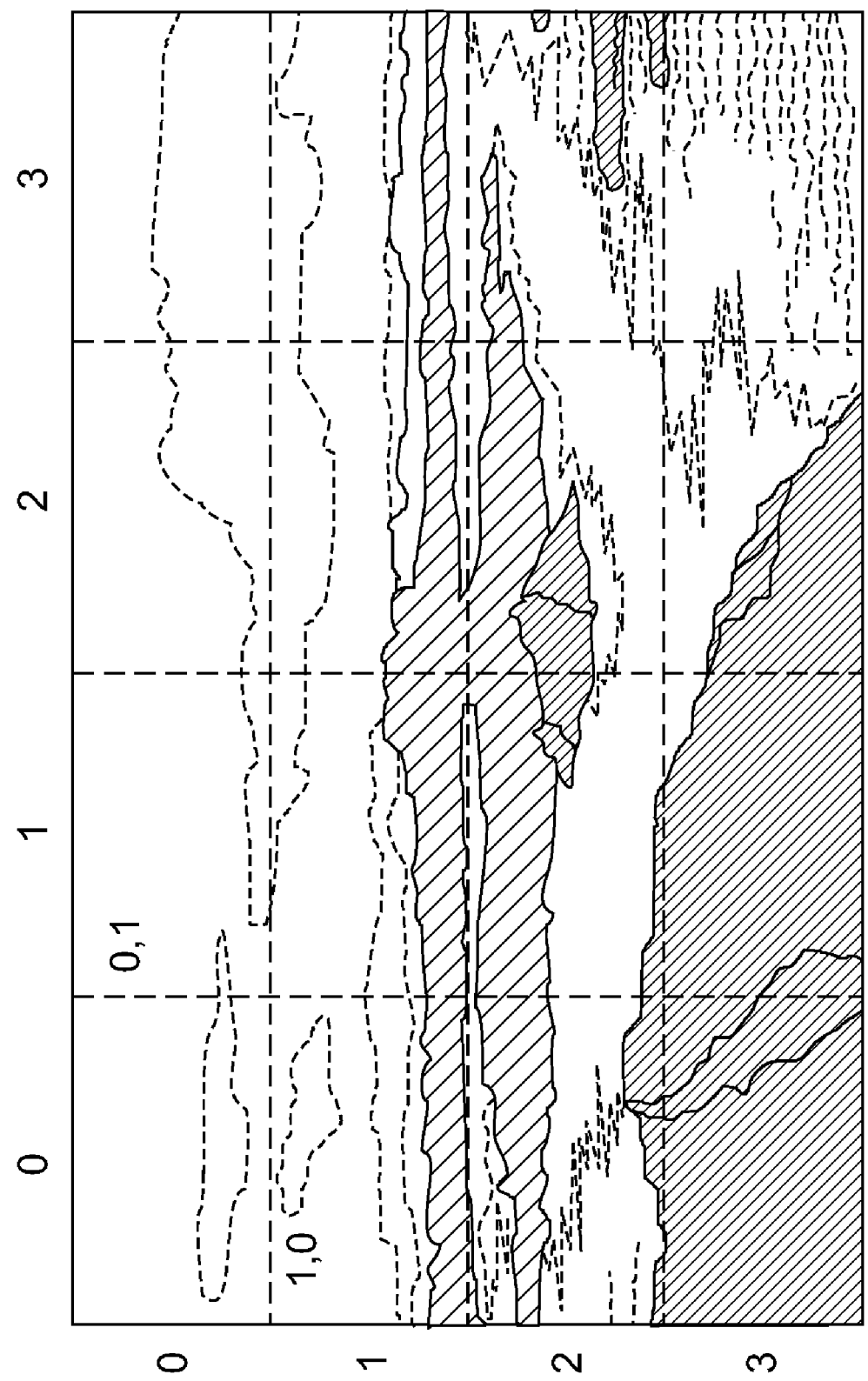
FIG. 4 depicts a typical image subdivided into sixteen sub-images.
Figure 5A:
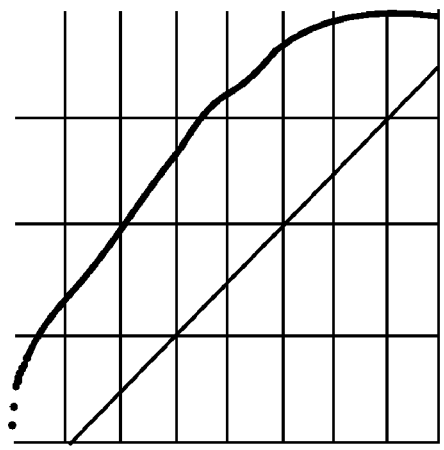
FIG. 5 illustrates several cumulative histograms made from effective luminance vs. effective saturation plots for several different types of images.
Figure 5B:
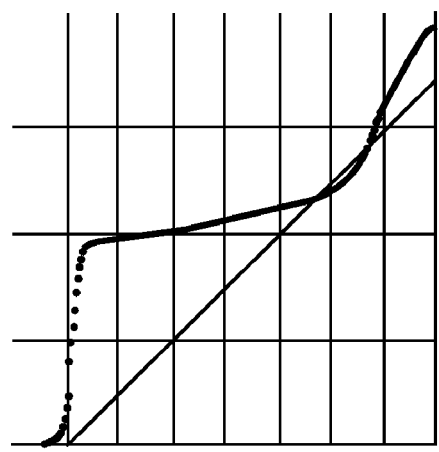
Figure 5C:
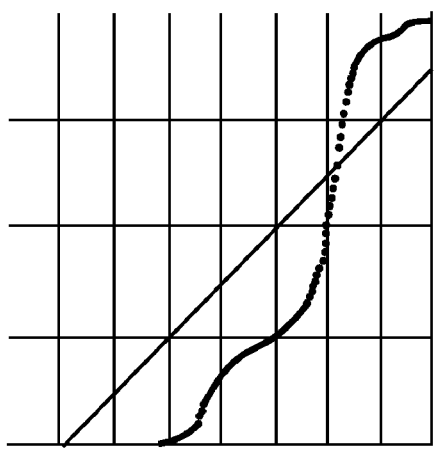
Figure 5D:
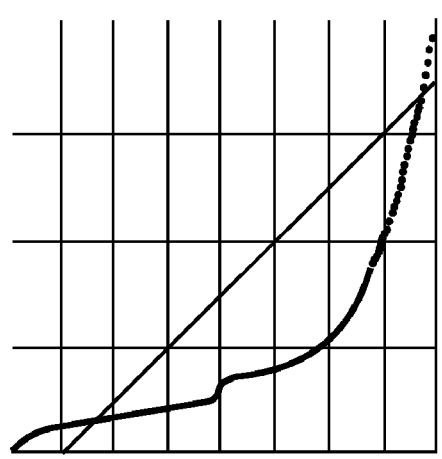

FIG. 4, from U.S. Pat. No. 5,581,370 shows a sketch of an image divided into sixteen sub areas. The histogram for each area is calculated separately and the mean and variance of each sub-area histogram is calculated.

The third sub-test is derived from a more direct process of γ detection. The evaluation method we use was first described in detail in U.S. Pat. No. 6,192,149B1, hereby incorporated by reference in its entirety. In this evaluation the subsampled image was subjected to a further transform to what is referred to as "effective luminance" and "effective saturation." As described in U.S. Pat. No. 6,192,149B1, also hereby incorporated by reference in its entirety, a possible algorithm to accomplish this transformation is:

$$\text{Effective Saturation} = \max(r,g,b) - \min(r,g,b) - \tfrac{1}{2} + |\tfrac{1}{2} - \text{mid}(r,g,b)| \qquad \text{Eq. 4}$$

$$\text{Effective Luminance} = \tfrac{1}{2}[\max(r,g,b) + \min(r,g,b)] \qquad \text{Eq. 5}$$

where:
max(r,g,b) is the maximum value of each of the r,g,b triplets.
min(r,g,b) is the minimum value of each of the r,g,b triplets,
mid(r,g,b) is the middle value of each of the r,g,b triplets.

Subsequently, a cross plot of the effective luminance versus the effective saturation is formed, and then from the cross plot a cumulative histogram is derived. The cumulative histogram is divided into a small number of segments, on the order of 8-10. The cumulative histogram so derived is compared to a threshold line of the form:

$$H = (\text{Effective Luminance} - 32)/255 \qquad \text{Eq. 6}$$

The principle behind this comparison is that images whose gamma is larger than the target assumed for the image, will have histogram lie below the threshold line for many of the bands, and conversely for an image whose gamma is lower than the assumed target. For the present embodiment, the lowest and highest luminance bands are excluded, and count the number of bands that lie below the threshold line. This count is used for the image evaluation function, to be described below.

FIG. 5, also taken from U.S. Pat. No. 6,192,149B1, shows several possible plots of the histogram bands versus the threshold line. FIGS. 5A and 5B show histograms where most of the bands are above the line, indicating that for this image the target gamma value being tested is too low. Similarly, FIGS. 5C and 5D show histograms where most of the bands are below the threshold line indicating that the target gamma value is too high.

The fourth, and final, sub-test is to look at the luminance values of the darkest colors of the image. In order to do this, the sub-sampled and YES-transformed image is subjected to some form of clustering analysis in the color space. Such a clustering analysis divides the representation of the sampled pixels in the three dimensional YES space into a predetermined number of clusters. The method by which the clusters are identified varies with the particular clustering algorithm employed, but in general all these methods try to identify separated groups of pixels in the image. As an example, a Heckbert-type of median cut algorithm may be applied to the image. See "Color Image Quantization for Frame Buffer Display" in SIGGRAPH Proceedings, 1982, pp. 297-307, hereby incorporated by reference in its entirety. It has been found that a Heckbert median cut analysis that divides the image into 16 clusters is sufficient to provide a fine enough detail for the present tests. From this clustering analysis, the Y values for each cluster are averaged, and kept for further analysis the lowest two average Y values, which are called Y0 and Y1.

At this point seven parameters have been derived:

γ and γ100 from the exposure sub-test,

Variance and NumHisto from the contrast sub-test,

NumGamma from the direct gamma test,

Y0 and Y1 from the color clustering analysis.

These seven parameters can be combined to give a functional value for the image as follows:

$$Score = Gamma\_score + Variance\_score + NumHisto\_score + Cluster\_score + \max(0, Gamma\_score) + \max(0, variance\_score) + \max(0, NumHisto\_score) + \max(0, Cluster\_score). \quad \text{Eq. 7}$$

While other functional forms are possible, the simple combination shown is adequate and has a minimal computing expense.

The individual scores (Gamma_score, Variance_score, NumHisto_score, and Cluster_score) are first set to zero and then adjusted as follows:

If either γ100 or γ is found to be negative (image is "too dark") then the Gamma_score is increased by 2, if γ or γ100 is reported as "good", the Gamma_score is decreased by 1.

If the Variance is characteristic of a low contrast image, then the Variance_score is set to 2 or 4 depending on the actual variance. Several variance penalties may be added as follows: define two ranges, range1 and range 2, where range1 is less than range2; say 30 and 75. If the variance is greater than range 1 and greater than 2*best variance an additional variance penalty of 2 is assessed. If the variance is greater than range1, then an additional penalty of 2 is assessed. If the variance is greater than range2, then an additional penalty of 4 is assessed. Thus the actual additional penalty may be 0, 2, 4, or 6. If the image chosen has the best variance of the test images then its Variance_score is decreased by 1. Additionally the image with the largest number of good contrast image areas (largest NumHisto) gets its Variance_score decreased by 1.

The image with the worst NumGamma value gets an its gamma_score increased by 1.

The values of Y0 and Y1 for each image are compared to the above preselected thresholds, and then the Cluster_score is increased by 3. Thresholds of 10 for Y0 and 20 for Y1 have been found to provide good results. This test is applied for each of Y0 and Y1 separately.

The above scoring procedure is applied for each potential gamma candidate image in turn. When all candidate gamma values have been subjected to the tests described, the image with the lowest score is selected as being the image with the proper gamma. The suitably modified original image is then passed on for further processing and printing.

It should be noted that after the proper gamma for the image has been identified by this procedure, further image adjustment may provide additional improvement in the printed image quality. Since the sub-tests have been derived from processes that are designed to test for these further enhancement opportunities, it is possible to retain the test information derived during the gamma-testing phase, and to use it to further correct the image, after its gamma has been determined.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing digital images comprising:
    (a) receiving a digital image to be printed;
    (b) selecting one of a predetermined set of target image gamma values;
    (c) transforming the digital image so that its gamma is equal to one of the predetermined set of target image gamma values;
    (d) applying a first image evaluation test to the transformed image, including measuring at least a first image parameter of the transformed digital image;
    (e) applying a second image evaluation test to the transformed image, including measuring at least a second image parameter of the transformed digital image, wherein the first and second image parameters are different;
    (f) calculating an image quality function value using a pre-defined image quality function employing the values of the first image parameter and the second image parameter;
    (g) repeating steps (c) through (f) for each of the set of predetermined target gamma values;
    (h) selecting the target gamma value that has best value of the image quality function; and
    (i) printing the image using the selected target gamma value.

2. The method of claim 1 further comprising adding one or more additional image evaluation tests, each test measuring an image parameter of the transformed image, wherein each image parameter is unique, and where the image quality function employs all the image parameter values from the evaluations.

3. The method of claim 1 further comprising transforming the image to a three-component luminance-chrominance space when the received digital image is not so composed.

4. The method of claim 3 where the three component luminance-chrominance space is L*a*b*.

5. The method of claim 1 where at least one of the first and second image evaluation tests includes a test for the overall exposure quality of the image.

6. The method of claim 1 where at least one of the first and second image evaluation tests includes a test for the overall contrast of the image.

7. The method of claim 1 where at least one of the first and second image evaluation tests includes a test for the gamma of the image using an effective luminance and an effective saturation of the image.

8. The method of claim 1 where at least one of the first and second image evaluation tests includes a test for image quality that examines the luminance values of dark colors of the image.

9. A system for processing an image comprising:
(a) a source of digital images;
(b) an image memory connected to said source of digital images;
(c) a gamma transformation module connected to the image memory, said gamma transformation module transforming the gamma of the stored digital image to a new gamma value chosen from a set of predefined test gamma values;
(d) an image evaluation module, connected to the gamma transformation module, wherein the image evaluation module measures a first parameter of the gamma-transformed image, and then measures a second parameter of the gamma-transformed image and where the first and second parameters are different;
(e) an image quality function computation module receiving the parameter values from the image evaluation module which computes an image quality value based on the first and second parameters and a predefined function of the parameters; and
(f) a control module connected to the image memory, the gamma transformation module, the image evaluation module, and the image quality function module, wherein the control module sets the test gamma value to be used, and keeps a record of the value of the image quality function for each test gamma value, said control module, upon determining that all of the predefined set of test gamma values have been evaluated, sends the gamma value with the best image quality value to a printer for printing the image using that gamma value.

10. The system of claim 9 where said image memory module further comprises means for transforming the input image to a three component luminance-chrominance space if it is not already so composed.

11. The system of claim 10 where the three component luminance-chrominance space is Xerox YES space.

12. The system of claim 10 where the three component luminance-chrominance space is L*a*b*.

13. The system of claim 10 where at least said first image evaluation module tests the overall exposure quality of the image.

14. The system of claim 10 where at least said first image evaluation module tests the overall contrast of the image.

15. The system of claim 9 where one of the parameters evaluated by the image evaluation module comprises a direct test of the gamma of the image using the effective luminance and effective saturation of the image.

16. The system of claim 9 where one of the parameters evaluated by the image evaluation module comprises a test based on examining the luminance values of the darkest colors of the image.

17. The system of claim 9 wherein the image evaluation module further comprises at least a third image parameter test and wherein the image evaluation module utilizes any such additional parameters in calculating the image quality function value.

18. An image processing system associated with a printer, comprising:
   a source of digital images;
   an image memory connected to said source of digital images for storing digital images;
   a gamma transformation module connected to the image memory, said gamma transformation module transforming the gamma of the stored digital image to a new gamma value chosen from a set of predefined test gamma values;
   an image evaluation module, connected to the gamma transformation module, wherein the image evaluation module measures a first parameter of the gamma-transformed image, and a second parameter of the gamma-transformed image and where the first and second parameters are different;
   an image quality function computation module receiving the parameter values from the image evaluation module which computes an image quality value based on the first and second parameters and a predefined function of the parameters; and
   a control microprocessor connected to the image memory, the gamma transformation module, the image evaluation module, and the image quality function module, wherein the control module sets the test gamma value to be used, and stores a record of the value of the image quality function for each test gamma value, said control module, upon determining that all of the predefined set of test gamma values have been evaluated, sends the gamma value with the best image quality value to the printer for printing the image using that gamma value.

19. The system of claim 18 where said image memory module further comprises means for transforming the input image to a three component luminance-chrominance space if it is not already so composed.

20. The system of claim 18 wherein the image evaluation module further comprises at least a third image parameter test and wherein the image evaluation module utilizes any such additional parameters in calculating the image quality function value.

* * * * *